United States Patent [19] [11] 3,718,681
Adams [45] Feb. 27, 1973

[54] ACYLOXYBENZOYLOXYSILANES
[75] Inventor: Patrick James Adams, Tecumseh, Mich.
[73] Assignee: Stauffer-Wacker Silicone Corporation, Adrian, Mich.
[22] Filed: April 23, 1970
[21] Appl. No.: 43,312

Related U.S. Application Data

[62] Division of Ser. No. 734,248, June 4, 1968, Pat. No. 3,542,836.

[52] U.S. Cl..260/448.2 R, 260/2.5 AM, 260/46.5 H, 260/46.5 R, 260/405, 260/448.2 H
[51] Int. Cl. ............................... C07f 7/02, C07f 7/08
[58] Field of Search ........260/405, 448.2 R, 448.2 H; 424/184

[56] References Cited

UNITED STATES PATENTS 2,634,285   4/1953   Rust et al.......................260/448.2 R
2,770,632   11/1956  Merker..........................260/448.2 R
3,542,836   11/1970  Adams..........................260/448.2 R

FOREIGN PATENTS OR APPLICATIONS 1,076,330   2/1960   Germany..............................424/184
1,098,512   2/1961   Germany..............................424/184
  971,486   9/1964   Great Britain........................424/184

OTHER PUBLICATIONS

"Comptes Rendus, Société de Biologie," 157, pps. 631–634, (7/63).

Primary Examiner—Daniel E. Wyman
Assistant Examiner—P. F. Shaver
Attorney—Marion D. Ford

[57] ABSTRACT

Acyloxyaroyloxysilanes and acyloxyaroyloxysiloxanes, especially acyloxybenzoyloxysilanes and acyloxybenzoyloxysiloxanes, are described as new compositions of matter. These compositions are useful as cross-linkers and surfactants for polyurethanes.

5 Claims, No Drawings

ACYLOXYBENZOYLOXYSILANES

This is a division of application Ser. No. 734,248, filed June 4, 1968, now U.S. Pat. No. 3,542,836.

The present invention relates to acyloxyaroyloxysilanes and acyloxyaroyloxysiloxanes and methods for preparing the same. More particularly, the invention is directed to acyloxybenzoyloxysilanes and acyloxybenzoyloxysiloxanes and to their uses as cross-linkers and surfactants in polyurethanes.

It is an object of this invention to provide acyloxyaroyloxysilanes and acyloxyaroyloxysiloxanes. Another object of this invention is to provide compositions which are useful as surfactants in polyurethanes.

More specifically, this invention relates to silanes having the general formula:

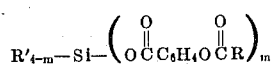

and siloxanes having the general formula:

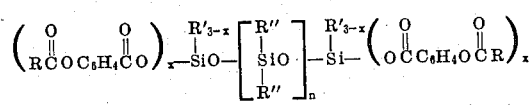

wherein R and R', which may be the same or different, represent monovalent hydrocarbon radicals, halogenated monovalent hydrocarbon radicals, or hydrogen; R'' represents monovalent hydrocarbon radicals, halogenated monovalent hydrocarbon radicals, and cyanoalkyl radicals; $m$ is a number of from 1 to 4; $n$ is a number of from 0 to 10.000; and $x$ is a number of from 1 to 3.

Examples of suitable monovalent hydrocarbon radicals are alkyl radicals, such as methyl, ethyl, propyl, butyl, hexyl, etc.; aryl radicals, such as phenyl, diphenyl, naphthyl, etc.; alkaryl radicals, such as tolyl, xylyl, ethylphenyl, etc.; aralkyl radicals, such as benzyl, phenethyl, and the like. Examples of halogenated hydrocarbon radicals are haloalkyl radicals, such as 3,3,3-trifluoropropyl, bromodichloromethyl, etc., and haloaryl radicals, such as chlorophenyl, tetrachlorophenyl, difluorophenyl, and the like.

The silanes of this invention may be prepared by reacting a silane with an acyloxybenzoic acid in accordance with the following equation:

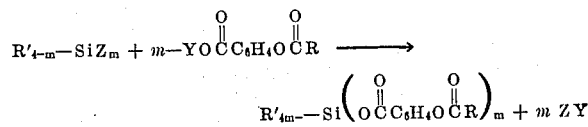

wherein R, R', and $m$ are the same as those represented above; Z is selected from the class consisting of acyloxy groups and halogens, e.g., chlorine, bromine, iodine, and fluorine; and Y is hydrogen or an alkali or alkaline earth metal.

Examples of suitable silanes are silicon tetrachloride, methyltrichlorosilane, ethyltrichlorosilane, butyltrichlorosilane, butyltrifluorosilane, hexyltrifluorosilane, dimethyldichlorosilane, dibutyldichlorosilane, trimethylchlorosilane, phenyltrichlorosilane, diphenyldichlorosilane, acetoxytrichlorosilane, and the like.

In preparing the acyloxybenzoyloxysiloxanes of this invention, acyloxy- or halo-terminated organopolysiloxanes are reacted with acyloxybenzoic acid or derivatives thereof in accordance with the following equation:

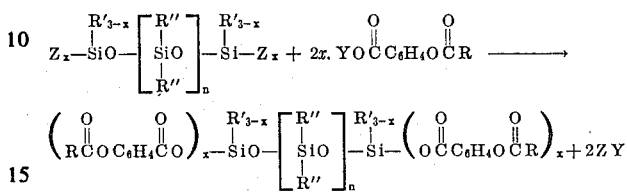

in which R, R', R'', Y, Z, $n$ and $x$ are the same as those represented above.

Examples of suitable organopolysiloxanes are dimethylpolysiloxane, methylethylpolysiloxane, methylphenylsiloxane, methylvinylsiloxane, methyl-beta-cyanopolysiloxane, methyltetrachlorophenylpolysiloxane, and the like. In addition, the organopolysiloxanes may be copolymers of various types of siloxane units. For example, they can be copolymers of dimethylsiloxane units and methylphenylsiloxane units, methylvinylsiloxane units, or methyl-beta-cyanoethylsiloxane units.

In addition to the halogen groups, the siloxanes may also contain organic or other hydrolyzable groups on the terminal silicon atom. These siloxanes may be reacted with an acyloxybenzoic acid or metal salts thereof to form end-blocked organopolysiloxanes which have surfactant properties.

The amount of acyloxybenzoic acid or metal salt of an acyloxybenzoic acid employed may vary from about 1 to 4 moles per mole of silane and more preferably about 1 mole per active group present on the silicon atom. In other words, the number of active groups on a silicon atom and the type of substituted silane or siloxane desired will determine the moles of acyloxybenzoic acid or metal salt thereof which will be reacted with the silane or polysiloxane.

Preferably, the reaction between the acyloxybenzoic acid or metal salts thereof and the silane or siloxane is carried out in the presence of an inert solvent which can be, for example, decalin, dioxane, benzene, toluene, xylene, and the like. The temperature range over which the reaction may be carried out may vary from about 25°C. to about 200°C. depending upon the particular reaction conditions employed. It has been found convenient to carry out the reaction of this process at reflux temperature although lower temperatures may be employed if desired. The time of the overall reaction will vary widely and generally will range from about 2 to 10 hours or more. Although the process of the invention can be advantageously operated at atmospheric pressure, subatmospheric pressure as well as pressures up to about 3 to 4 atmospheres or more may be utilized.

The products of this invention can be conveniently recovered from the reaction mixture by distillation or other methods known in the art. The compounds of this invention are useful as cross-linking agents, hydraulic fluids, heat transfer media, transformer oils, and surfactants. They are particularly suitable as cell control agents in polyurethane foams.

Organopolysiloxanes which contain more than two acyloxybenzoyloxy groups may be cured at room temperature to form elastomeric materials. For example, such a composition may be cured by merely exposing it to atmospheric moisture with or without any additional water vapor. Upon exposure to moisture, the composition will cure at times varying from a few minutes to several hours or days.

The curing time of these organopolysiloxanes may be substantially accelerated by incorporating therein metal salts of organic carboxylic acids, such as dibutyltin dilaurate, tin octoate, iron stearate, and the like.

Various embodiments of this invention are further illustrated by the following examples in which all parts are by weight unless otherwise specified.

EXAMPLE 1

To a reactor containing 550 parts of o-acetoxybenzoic acid in about 100 parts of toluene is added dropwise about 150 parts of methyltrichlorosilane in about 50 parts of toluene. The reactants are heated to reflux temperature and reacted for 4 hours with agitation and filtered. The toluene is removed by vacuum distillation, yielding a product which is identified as methyltris(o-actoxybenzoyloxy)silane.

EXAMPLE 2

In accordance with the procedure described above, about 180 parts of o-acetoxybenzoic acid is reacted with 150 parts of methyltrichlorosilane in about 150 parts of toluene. A product is recovered which is identified as methyl-o-acetoxybenzoyloxydichlorosilane.

EXAMPLE 3

In accordance with the procedure described in Example 1, about 609 parts of sodium acetoxybenzoate is reacted with 150 parts of methyltrichlorosilane in about 200 parts of toluene. A product is recovered which by infrared analysis appears to be the same as Example 1 and is identified as methyltris(o-acetoxybenzoyloxy)silane.

EXAMPLE 4

To a reactor containing 51 parts of o-acetoxybenzoic acid dispersed in 110 parts of toluene is added dropwise about 54 parts of a chlorine-terminated dimethyl-polysiloxane having a molecular weight of about 425 and heated to reflux temperature for 4 hours. The reaction mass is filtered and the solvent removed by vacuum distillation. A liquid product which is yellow in color is recovered which by infrared analysis shows the absence of the chlorine group.

The bis(acetoxybenzoyloxy)siloxane prepared in accordance with the procedure described above is incorporated in the following urethane formulation as a surfactant:

| | |
|---|---|
| trifunctional polypropylene glycol (LG–56) | 150.000 parts |
| triethylamine (2.8 percent in water) | 5.55 parts |
| stannous octoate | 1.00 part |
| methylene chloride | 9.00 parts |
| siloxane | 2.25 parts |
| toluene diisocyanate | 69.10 parts |

The aqueous amine, stannous octoate, methylene chloride, and siloxane are added to the triol and agitated for exactly 8 seconds. The toluene diisocyanate is added to the reaction mixture and agitated for an additional 7 seconds and transferred to a prepared cardboard box mold. After the foam rises to a maximum height, it is placed in a vented oven to cure for 15 minutes at 130°C. The foam is then removed from the mold, cut in half and inspected. The foam rises about 5 ¼ inches in height, contains closed cells and is free of splits.

It will be understood that the above description is merely illustrative of preferred embodiments of the invention of which many variations may be made within the scope of the following claims by those skilled in the art without departing from the spirit thereof.

The invention claimed is:

1. A silane of the formula:

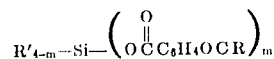

wherein R and R' are selected from the class consisting of hydrogen, monovalent hydrocarbon radicals and halogenated monovalent hydrocarbon radicals, and $m$ is a number of from 1 to 4.

2. The composition of claim 1 wherein R is an alkyl radical.

3. The composition of claim 1 wherein $m$ is 4.

4. The composition of claim 1 wherein $m$ is 3 and R' is a hydrocarbon radical.

5. A method for preparing the composition of claim 1 which comprises reacting a silane of the formula

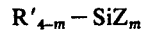

with a acyloxybenzoic acid of the formula

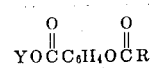

in which R and R' are selected from the group consisting of monovalent hydrocarbon radicals, halogenated monovalent hydrocarbon radicals, cyanoalkyl radicals and hydrogen, Z is selected from the class consisting of acyloxy radicals and halogen; Y is selected from the group consisting of hydrogen, alkali metals and alkaline earth metals and $m$ is a number of from 1 to 4.

* * * * *